US012164269B2

(12) United States Patent
Hashizume et al.

(10) Patent No.: US 12,164,269 B2
(45) Date of Patent: Dec. 10, 2024

(54) ELECTRONIC TIMEPIECE

(71) Applicant: Seiko Epson Corporation, Tokyo (JP)

(72) Inventors: Saori Hashizume, Shimosuwa (JP); Fumiaki Miyahara, Ina (JP)

(73) Assignee: SEIKO EPSON CORPORATION (JP)

( * ) Notice: Subject to any disclaimer, the term of this patent is extended or adjusted under 35 U.S.C. 154(b) by 377 days.

(21) Appl. No.: 17/676,329

(22) Filed: Feb. 21, 2022

(65) Prior Publication Data

US 2022/0269224 A1 Aug. 25, 2022

(30) Foreign Application Priority Data

Feb. 22, 2021 (JP) ................................ 2021-025979

(51) Int. Cl.

| | |
|---|---|
| ***G04R 60/12*** | (2013.01) |
| ***G04B 43/00*** | (2006.01) |
| ***G04G 21/04*** | (2013.01) |

(52) U.S. Cl.

CPC ........... *G04R 60/12* (2013.01); *G04B 43/007* (2013.01); *G04G 21/04* (2013.01)

(58) Field of Classification Search

CPC ........ G04R 60/12; G04R 20/08; G04R 60/14; G04R 60/10; G04R 60/00; G04B 43/007; G04B 43/00; G04G 21/04; G04G 17/00; G04C 3/146

See application file for complete search history.

(56) References Cited

U.S. PATENT DOCUMENTS

| | | | | |
|---|---|---|---|---|
| 10,031,487 | B2 * | 7/2018 | Fujisawa | G04R 20/02 |
| 2008/0094942 | A1 * | 4/2008 | Oguchi | H01Q 7/08 368/47 |
| 2014/0086026 | A1 | 3/2014 | Mitani et al. | |
| 2017/0068220 | A1 | 3/2017 | Hosobuchi et al. | |
| 2017/0261944 | A1 | 9/2017 | Fujisawa | |
| 2018/0307186 | A1 | 10/2018 | Fujisawa | |
| 2019/0294120 | A1 * | 9/2019 | Nakajima | G04G 19/00 |

FOREIGN PATENT DOCUMENTS

| | | | |
|---|---|---|---|
| CN | 103676632 | A | 3/2014 |
| JP | 2016-161380 | A | 9/2016 |
| JP | 2017-053634 | A | 3/2017 |
| JP | 2017-161338 | A | 9/2017 |
| JP | 2017-227574 | A | 12/2017 |

* cited by examiner

*Primary Examiner* — Edwin A. Leon

(74) *Attorney, Agent, or Firm* — Harness, Dickey & Pierce, P.L.C.

(57) ABSTRACT

Provided is an electronic timepiece including: an antenna configured to receive a standard radio wave, a pointer, a motor configured to drive the pointer, a circuit board having a front surface mounted with a semiconductor device including an active region, and a magnetic shield plate disposed at a back surface side of the circuit board, the magnetic shield plate having a shape that overlaps at least a portion of the motor and does not overlap the active region of the semiconductor device in plan view as viewed in a direction orthogonal to the front surface of the circuit board.

5 Claims, 6 Drawing Sheets

ELECTRONIC TIMEPIECE

The present application is based on, and claims priority from JP Application Serial Number 2021-025979, filed Feb. 22, 2021, the disclosure of which is hereby incorporated by reference herein in its entirety.

BACKGROUND

1. Technical Field

The present disclosure relates to an electronic timepiece.

2. Related Art

JP-A-2017-53634 discloses a timepiece having a configuration in which an antenna device and motors are disposed between a main plate and a bearing member, a circuit board is disposed on the bearing member in an overlapping manner, and individual magnetic shield plates are disposed on the circuit board at positions corresponding to the respective motors. Further, JP-A-2017-53634 discloses a technique where some or all individual magnetic shield plates are coupled to a planar magnetic shield plate. With such a configuration, the number of parts can be reduced and the number of assembling man-hours can be reduced compared to a case where the respective magnetic shield plates are individually manufactured and assembled.

In the electronic timepiece including motors, it is preferable to form a magnetic shield plate using one sheet of plate because the assembling process can be further simplified. However, when the magnetic shield plate is formed of one sheet of plate, an area of the magnetic shield plate is increased and hence, a semiconductor device mounted on the circuit board is covered by the magnetic shield plate. Accordingly, there has been a problem that noises generated from an active region of the semiconductor device are transmitted to an antenna via the magnetic shield plate so that the reception sensitivity of the antenna is lowered.

SUMMARY

According to the present disclosure, there is provided an electronic timepiece including: an antenna configured to receive a standard radio wave, a hand, a motor configured to drive the hand, a circuit board having a front surface mounted with a semiconductor device including an active region, and a magnetic shield plate disposed at a back surface side of the circuit board, the magnetic shield plate having a shape that overlaps at least a portion of the motor and does not overlap the active region of the semiconductor device in plan view as viewed in a direction orthogonal to the front surface of the circuit board.

DESCRIPTION OF EXEMPLARY EMBODIMENTS

Hereinafter, an electronic timepiece according to an embodiment of the present disclosure is described with reference to drawings.

Figure 1:
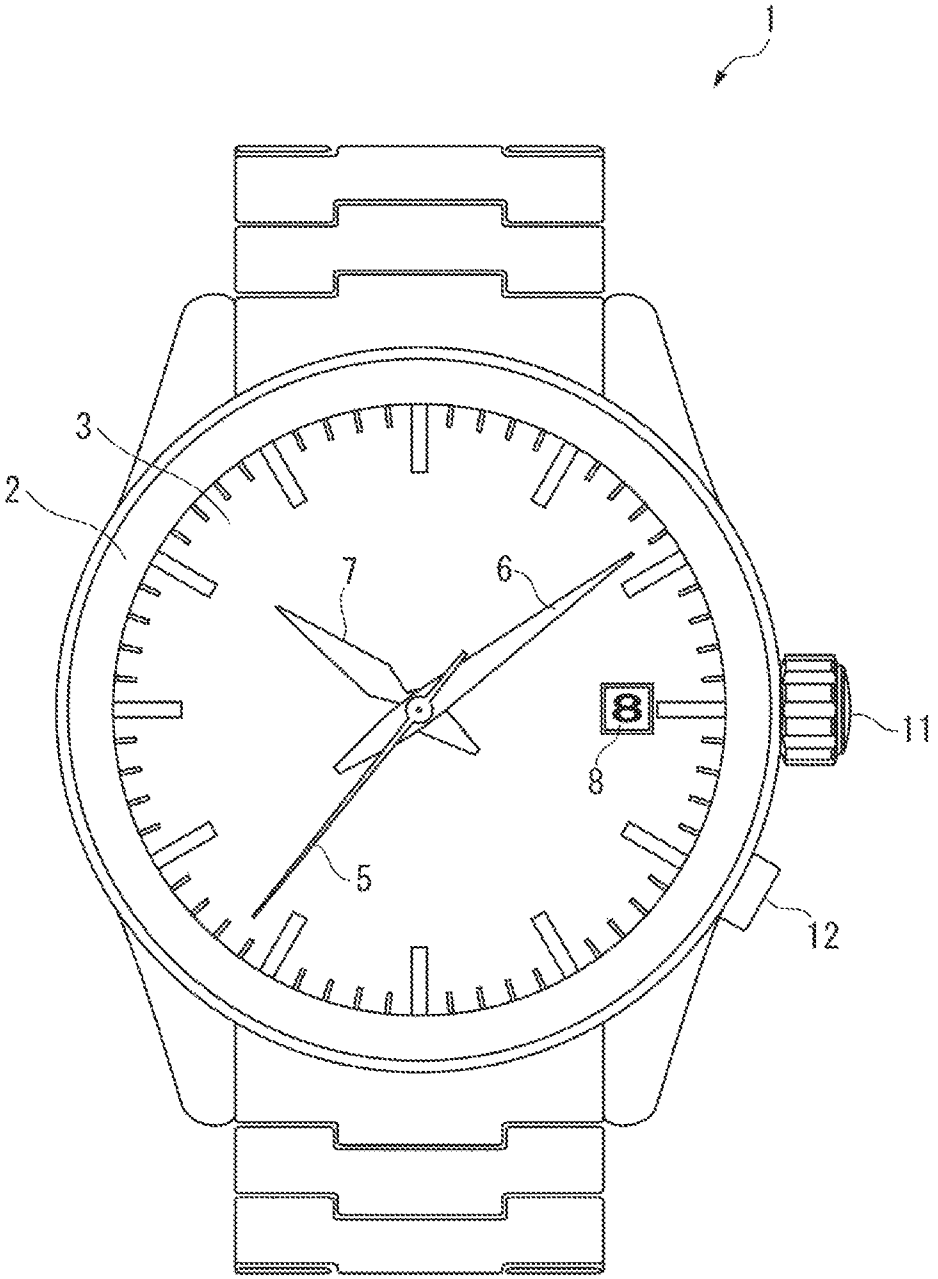
FIG. 1 is a front view illustrating an electronic timepiece.

As illustrated in FIG. 1, the electronic timepiece 1 is a watch that a user wears on his/her wrist. The electronic timepiece 1 includes an outer case 2, a dial 3 having a disk shape, a movement not illustrated in the drawing, a second hand 5, a minute hand 6, and an hour hand 7 as hands, a date indicator 8, a crown 11 and a button 12. The second hand 5, the minute hand 6, and the hour hand 7 are each attached to three hand shafts disposed at a central portion of the dial 3 as viewed in plan view orthogonal to a front surface of the dial 3 of the electronic timepiece 1. Here, the front surface of the dial 3 means a surface of the dial 3 on a cover glass side of the electronic timepiece 1. In the description made hereinafter, a surface of each part on a cover glass side is referred to as a front surface, and a surface of each part on a case back side is referred to as a back surface.

Circuit Configuration of Electronic Timepiece

Figure 2:
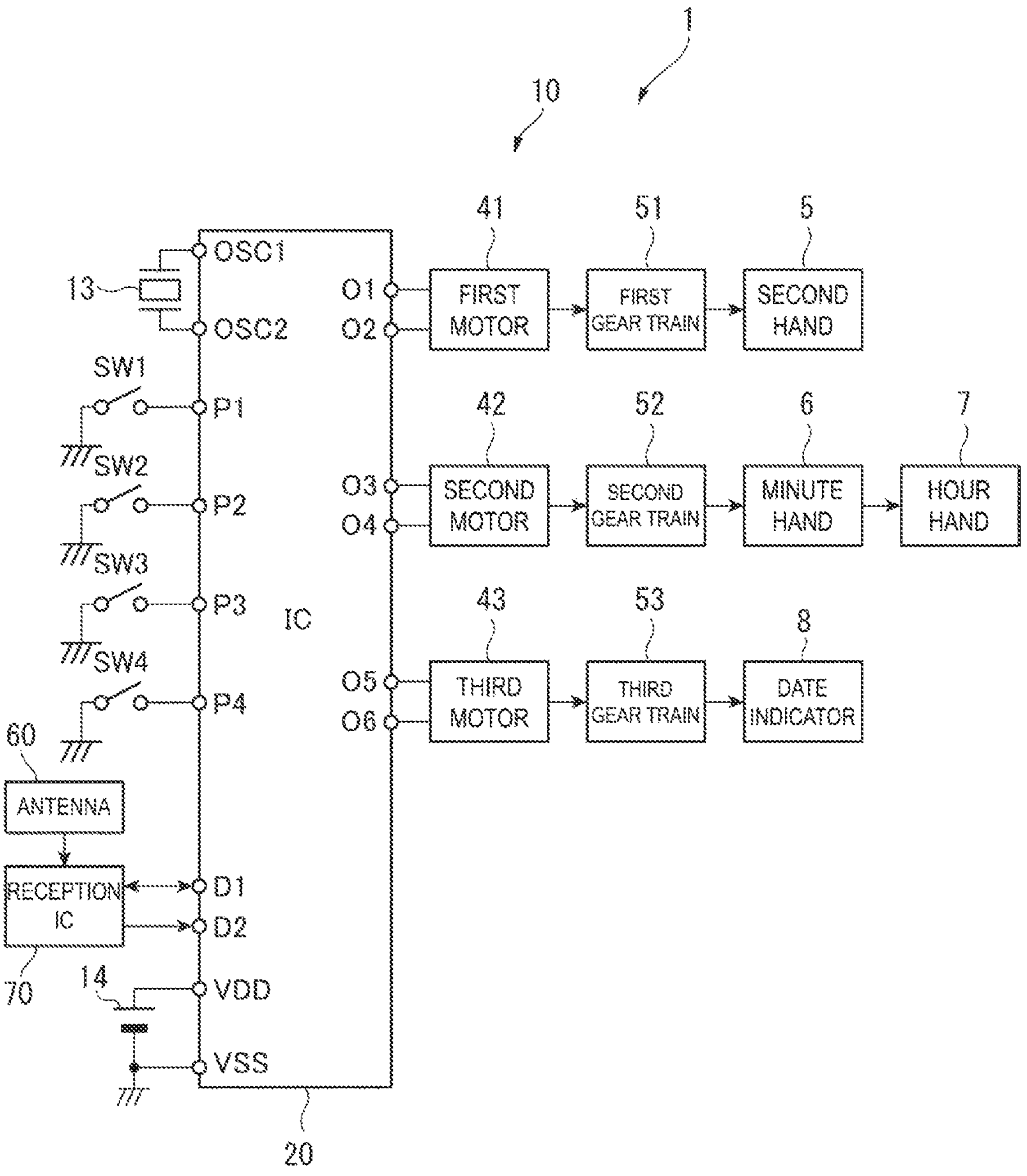
FIG. 2 is a block diagram illustrating a configuration of a movement of the electronic timepiece.

FIG. 2 is a diagram illustrating a configuration of the movement 10 of the electronic timepiece 1.

As illustrated in FIG. 2, the movement 10 includes a crystal oscillator 13, a battery 14, a control IC 20, a first motor 41, a second motor 42, a third motor 43, a first gear train 51, a second gear train 52, a third gear train 53, an antenna 60, a reception IC 70, and switches SW1 to SW4.

The crystal oscillator 13 is a reference signal source that generates an oscillation signal by being driven by an oscillation circuit 21 described later.

The battery 14 is constituted of a primary battery or a secondary battery. In case of using the secondary battery as the battery 14, the secondary battery is charged by a power generation device such as a solar cell not illustrated in the drawings.

The control IC 20 includes a coupling terminal OSC1, OSC2 to which the crystal oscillator 13 is coupled, an input terminal P1 to which the switch SW1 is coupled, an input terminal P2 to which the switch SW2 is coupled, an input terminal P3 to which the switch SW3 is coupled, an input terminal P4 to which the switch SW4 is coupled, power source terminals VDD, VSS to which the battery 14 is coupled, output terminals O1 to O6 coupled to coils of motors 41 to 43 respectively, and signal terminals D1, D2 coupled to the reception IC 70.

In the present embodiment, a positive electrode of the battery 14 is coupled to the power source terminal VDD on a high potential side, a negative electrode of the battery 14 is coupled to the power source terminal VSS on a low potential side, and the power source terminal VSS on the low potential side is grounded.

Here, "IC" is an abbreviation for Integrated Circuit, and refers to an integrated circuit. Accordingly, the electronic timepiece 1 includes the control IC 20, that is an integrated circuit, as a semiconductor device for controlling the electronic timepiece 1, and includes the reception IC 70, that is an integrated circuit, as a receiving semiconductor device of the antenna 60.

The first motor 41 is a stepper motor configured to move the second hand 5 by way of the first gear train 51, the second motor 42 is a stepper motor configured to move the minute hand 6 and the hour hand 7 by way of the second gear train 52, and the third motor 43 is a stepper motor configured to move the date indicator 8 by way of the third gear train 53.

The switch SW1 is a switch that is turned on and off in an interlocking manner with a pulling operation of the crown 11, the switch SW2 is a switch that is turned on and off in response to rotation of the crown 11 in a clockwise direction, the switch SW3 is a switch that is turned on and off in response to rotation of the crown 11 in the counterclockwise direction, and the switch SW4 is a switch that is turned on and off in an interlocking manner with an operation of the button 12.

Circuit Configuration of Control IC

Figure 3:
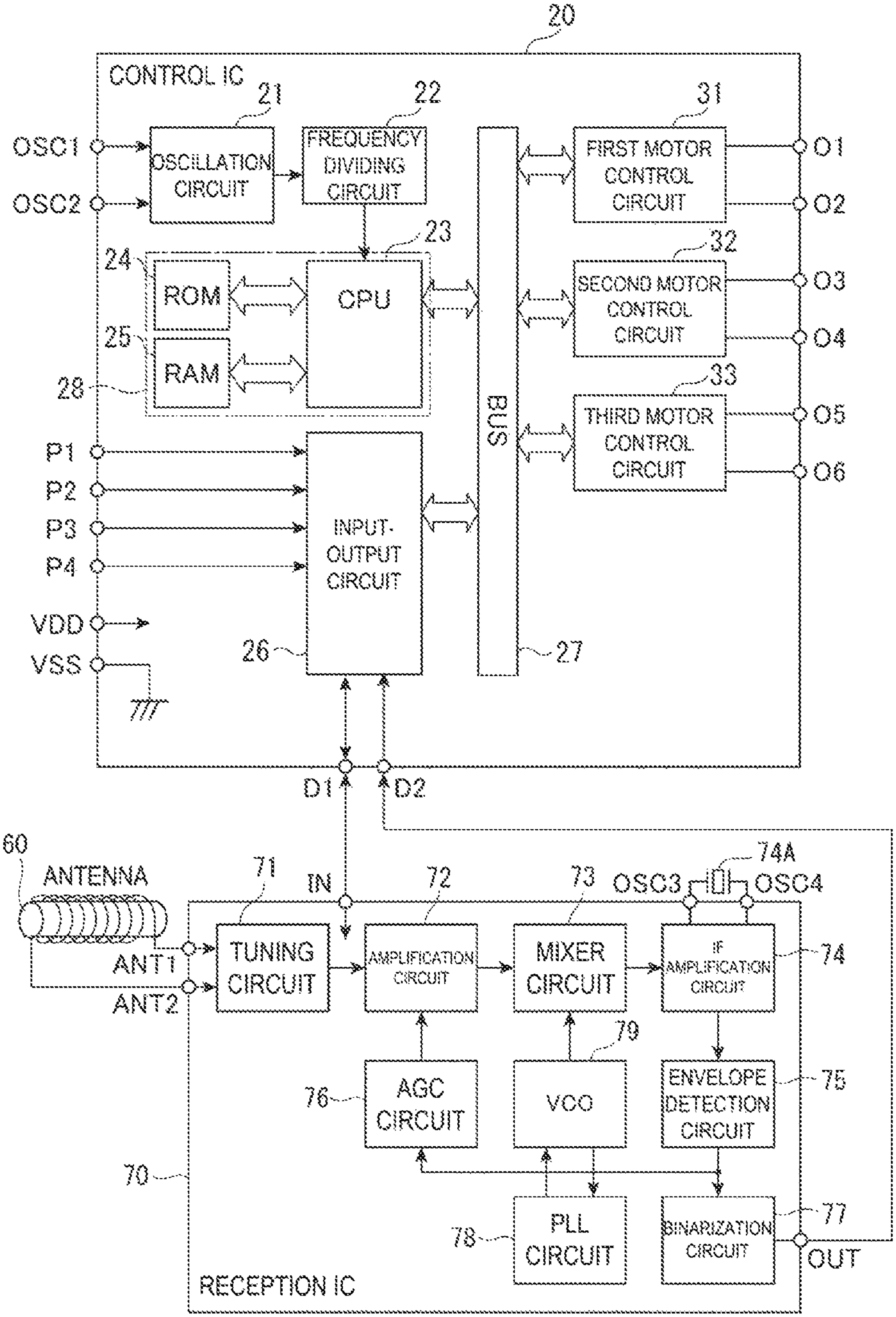
FIG. 3 is a block diagram illustrating a configuration of a control IC, and a configuration of a reception IC.

FIG. 3 is a block diagram illustrating a configuration of the control IC 20 and a configuration of the reception IC 70.

The control IC 20 includes an oscillator circuit 21, a frequency dividing circuit 22, a CPU 23, a ROM 24, a RAM 25, an input/output circuit 26, and a bus 27. Here, the "CPU" is an abbreviation for Central Processing Unit, the "ROM" is an abbreviation for Read Only Memory, and the "RAM" is an abbreviation for Random Access Memory.

The control IC 20 includes a first motor control circuit 31 configured to drive the first motor 41, a second motor control circuit 32 configured to drive the second motor 42, and a third motor control circuit 33 configured to drive the third motor 43.

The oscillator circuit 21 is configured to oscillate the crystal oscillator 13 that is a reference signal source at high frequency, and to output an oscillation signal at a predetermined frequency generated by the high frequency oscillation to the frequency dividing circuit 22.

The frequency dividing circuit 22 is configured to supply a timing signal (clock signal) to the CPU 23 by dividing an output of the oscillator circuit 21.

The ROM 24 stores various programs to be executed by CPU 23. In the present embodiment, the ROM 24 stores programs for realizing a basic timepiece function, a fast forwarding processing performed by the respective motors 41 to 43, and the like.

The RAM 25 is used for storing, or the like, a work memory when the CPU 23 executes the program and a time code that the CPU 23 receives.

The CPU 23 is configured to realize respective functions such as the drive control functions of the first motor control circuit 31, the second motor control circuit 32, and the third motor control circuit 33, for example, using the programs that the ROM 24 stores and the RAM 25. A control circuit 28 is constituted of these CPU 23, ROM 24, and RAM 25.

The input-output circuit 26 is configured to output states of the input terminals P1, P2, P3, and P4 to the bus 27, and to perform inputting and outputting of control signals and data between the input-output circuit 26 and the reception IC 70.

The bus 27 is used for transmission of data between the CPU 23, the input-output circuit 26, the first motor control circuit 31, the second motor control circuit 32, and the third motor control circuit 33.

The first motor control circuit 31 to the third motor control circuit 33 are configured to control driving of the first motor 41 to the third motor 43 based on instructions inputted from CPU 23 through the bus 27.

Circuit Configuration of Reception IC

The reception IC 70 is a semiconductor device for receiving that is configured to perform control for acquiring time information by receiving a long-wavelength standard radio wave signal using the antenna 60.

The antenna 60 is configured to receive a long-wavelength standard radio wave, and to output the received standard radio wave to the reception IC 70. The reception IC 70 is configured to demodulate the received signal of the standard radio wave that the antenna 60 receives, and to output the received signal to the control IC 20 as a TCO signal. Here, the "TCO" is an abbreviation for Time Code Out.

The reception IC 70 includes a tuning circuit 71, an amplification circuit 72, a mixer circuit 73, an IF amplification circuit 74 using a filter-use crystal 74A, an envelope detection circuit 75, an AGC circuit 76 as an automatic gain control circuit, and a binarization circuit 77, a PLL circuit 78, a VCO 79, antenna terminals ANT1, ANT2, an input terminal IN to which a control signal from the control IC is inputted, an output terminal OUT, and coupling terminals OSC3, OSC4 to which the filter-use crystal 74A is coupled. This reception IC 70 is a general integrated circuit for receiving standard radio waves and hence, detailed description of the reception IC 70 is omitted. Here, the "IF" is an abbreviation for Intermediate Frequency, the "AGC" is an abbreviation for Auto Gain Control, the "PLL" is an abbreviation for Phase Locked Loop, and the "VCO" is an abbreviation for Voltage Controlled Oscillator.

The tuning circuit 71 includes a capacitor, and a parallel resonance circuit is constituted of the tuning circuit 71 and the antenna 60. The tuning circuit 71 and the antenna 60 are coupled to each other via the antenna terminals ANT1, ANT2. With the provision of the tuning circuit 71, the reception IC is configured to selectively receive respective standard radio waves of "JJY40", "JJY60", "WWVB", "DCF77", "MSF", and "BPC". Here, when a user operates an operation member such as the crown 11, the button 12, or the like, a control signal is inputted from the control IC 20 to the reception IC 70 via the signal terminal D1 and the input terminal IN, and a type of standard radio wave to be received is selected.

The amplification circuit 72 is configured to adjust a gain in response to a signal (AGC voltage) inputted from the AGC circuit 76, to amplify the received signal inputted from the tuning circuit 71 to a fixed amplitude, and to input the received signal having the fixed amplitude to the mixer circuit 73. The mixer circuit 73 is configured to down-convert the received signal into an IF, that is, an intermediate frequency by mixing the received signal with a signal of the VCO 79.

The IF amplification circuit 74 is configured to further amplify the received signal inputted from the mixer circuit 73, and to output the further amplified received signal to the envelope detection circuit 75. The envelope detection circuit 75 includes a rectifier not illustrated in the drawing and a low-pass filter not illustrated in the drawing. The envelope detection circuit 75 is configured to rectify and filter a received signal inputted to the envelope detection circuit 75, and to output an envelope signal obtained by filtering the received signal to the AGC circuit 76 and the binarization circuit 77.

The AGC circuit 76 is configured to output a signal for determining a gain at the time of amplifying a received signal by the amplification circuit 72 based on the envelope signal inputted from the envelope detection circuit 75. The binarization circuit 77 is configured to output a binarized signal, that is, a TCO signal by comparing the envelope signal inputted from the envelope detection circuit 75 and a reference voltage (threshold value) to each other. The TCO signal is inputted to the control IC 20 via the output terminal OUT and the signal terminal D2, and is stored in the RAM 25.

Configuration of Movement

Figure 4:
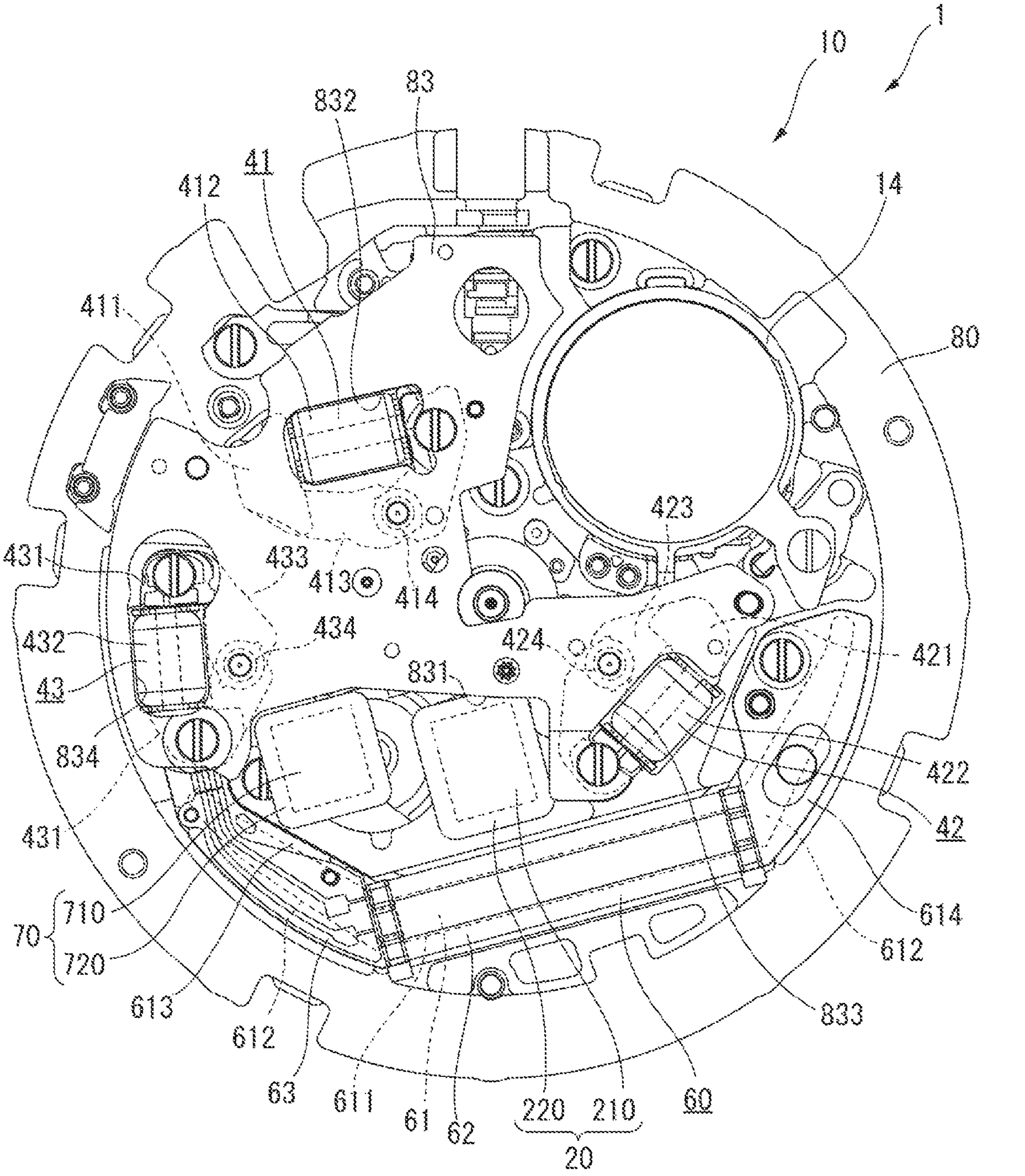
FIG. 4 is a view illustrating a main portion of a movement.
Figure 5:
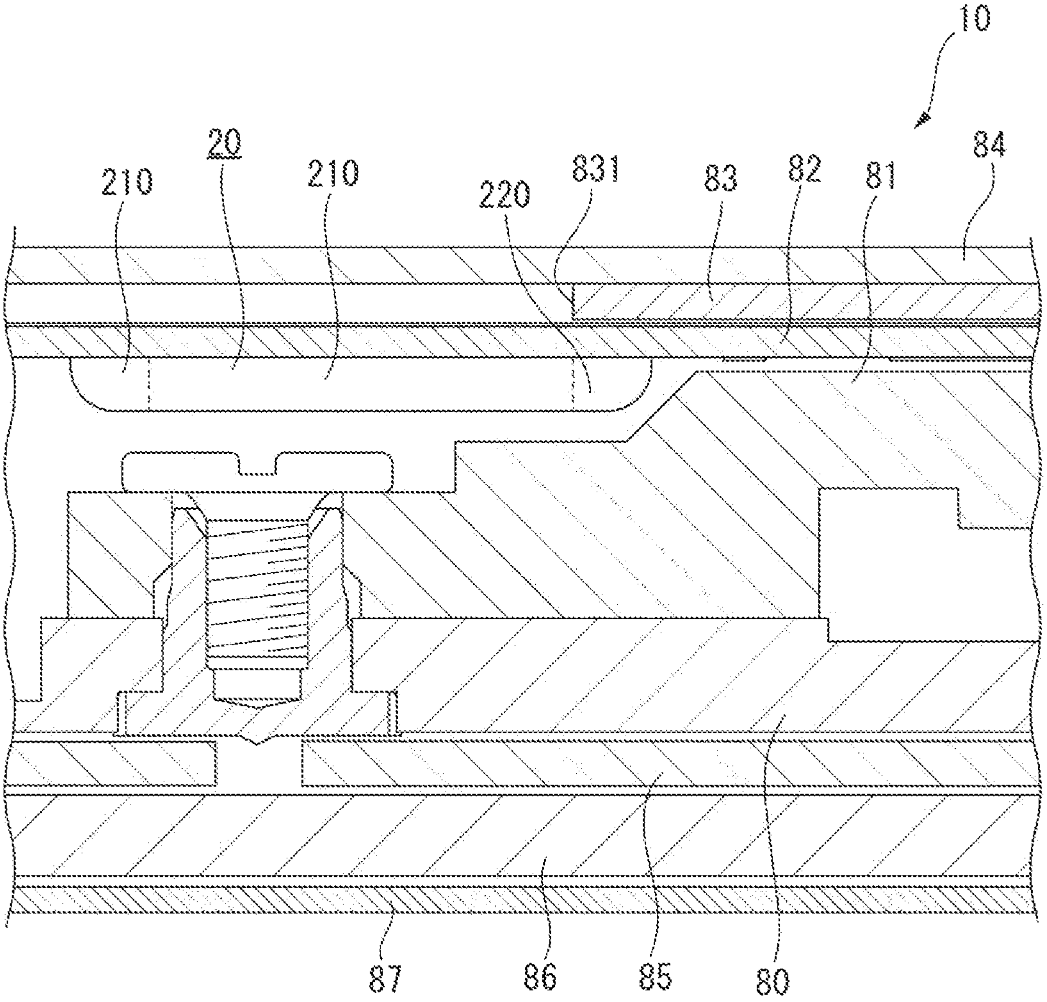
FIG. 5 is a cross-sectional view illustrating the main portion of the movement.

FIG. 4 is a back view illustrating a main portion of the movement 10, and FIG. 5 is a cross-sectional view illustrating the main portion of the movement 10.

As illustrated in FIG. 5, the movement 10 includes a main plate 80, a gear train holder 81 attached to a back surface side of the main plate 80, a circuit board 82 disposed on a back surface side of the gear train holder 81, a magnetic shield plate 83 disposed on a back surface side of the circuit board 82, and a circuit retainer 84 disposed on a back surface side of the magnetic shield plate 83. Further, the movement 10 includes an hour wheel maintaining plate 85 disposed on a front surface side of the main plate 80, a data indicator maintaining plate 86 disposed on a front surface side of the hour wheel maintaining plate 85, and a solar cell 87 disposed on a front surface side of the data indicator maintaining plate 86.

The first motor 41, the second motor 42, and the third motor 43 each include, as illustrated in FIG. 4, a core 411, 421 431, a motor coil 412, 422, 432 wound around the core 411, 421 431, a stator 413, 423, 433 coupled to the core 411, 421, 431 and a rotor 414, 424, 434 disposed in a hole formed in the stator 413, 423, 433. Each of these motors 41, 42, 43 is threadedly engaged with the back surface of the main plate 80. In FIG. 4 and FIG. 5, a first gear train 51, a second gear train 52, and a third gear train 53, that are not illustrated in the drawings, are disposed between the main plate 80 and the gear train holder 81, and are respectively pivotally supported.

The control IC 20 and the reception IC 70 are mounted on a surface of the circuit board 82. Here, in FIG. 4, the illustration of the circuit board 82 is omitted, and the control IC 20 and the reception IC 70 are illustrated.

Figure 6:
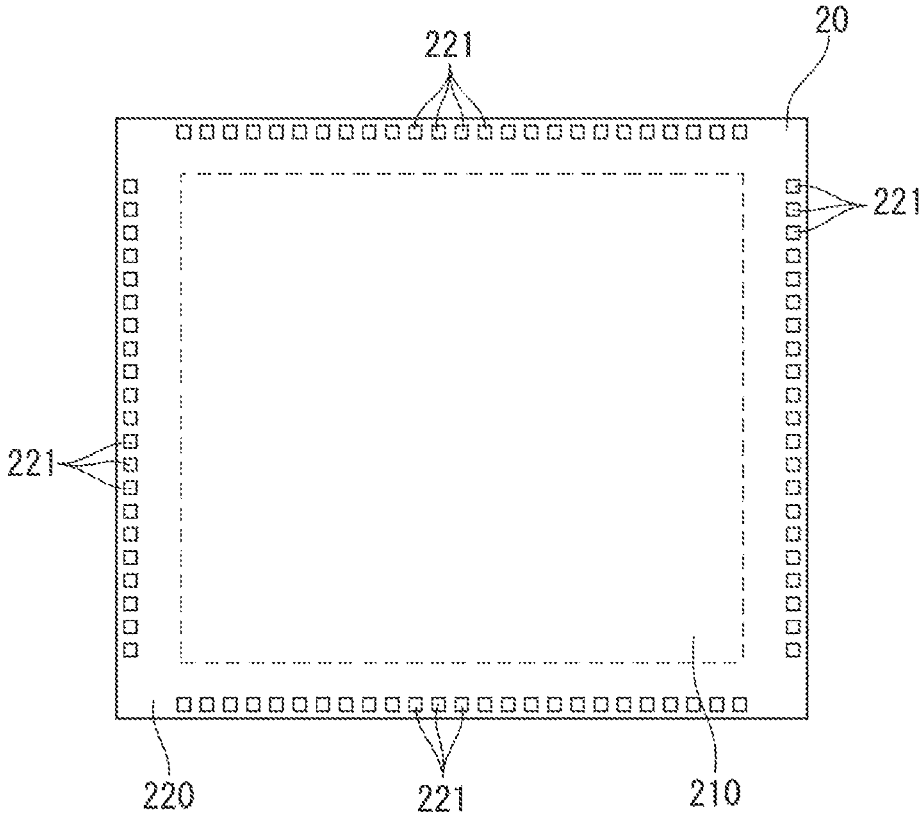
FIG. 6 is a plan view illustrating the control IC.

As also illustrated in FIG. 6, the control IC 20 includes an active region 210 and an inactive region 220. The active region 210 is disposed in a region on a center side of the control IC 20 as viewed in plan view when the control IC 20 is viewed in a direction orthogonal to a front surface of the circuit board 82, and the inactive region 220 is disposed on an outer periphery of the active region 210 as viewed in plan view.

In this embodiment, in the active region 210, the oscillation circuit 21, the frequency dividing circuit 22, the CPU 23, the ROM 24, the RAM 25, the first motor control circuit 31, the second motor control circuit 32, the third motor control circuit 33, and the like are disposed, and in the inactive region 220, pads 221 serving as an input-output unit coupled to the input-output circuit 26 and an electrostatic protective circuit are disposed. The input-output unit includes the coupling terminals OSC1, OSC2, the input terminals P1 to P4, the power source terminals VDD, VSS, the output terminals O1 to O6, and the signal terminals D1, D2. That is, in the active region 210, a circuit that may generate noises affecting the reception of radio waves at the antenna 60 is disposed, and in the inactive region 220, a circuit that does not generate noises affecting the reception of radio waves is disposed. Here, the electrostatic protective circuit is a circuit that is incorporated between the pads 221 and internal circuits, and is configured to prevent a static voltage that has entered from the outside of the control IC 20 from being applied to the internal circuits.

As illustrated in FIG. 4, the reception IC 70 includes an active region 710 and an inactive region 720. In the active region 710 of the reception IC 70, the tuning circuit 71, the amplification circuit 72, the mixer circuit 73, the IF amplification circuit 74, the envelope detection circuit 75, the AGC circuit 76, the binarization circuit 77, the PLL circuit 78, and the VCO 79 are disposed, and in the inactive region 720, pads serving as an input-output unit coupled to the antenna 60 and the control IC 20, and the electrostatic protective circuit are disposed. The input-output unit includes the antenna terminals ANT1, ANT2, the input terminal IN, the output terminal OUT, and the coupling terminals OSC3, OSC4. That is, in the active region 710, a circuit that may generate noises affecting the reception sensitivity of radio waves at the antenna 60 is disposed, and in the inactive region 720, a circuit that does not generate noises affecting the reception sensitivity of radio waves is disposed.

As illustrated in FIG. 4, the magnetic shield plate 83 disposed on a back surface side of the circuit board 82 is formed in a shape that causes the magnetic shield plate 83 to not overlap with the active region 210 of the control IC 20 and the active region 710 of the reception IC 70 as viewed in plan view. That is, the magnetic shield plate 83 is formed in a shape having a cutout portion 831 that is cut out in a concave shape so as to cause the magnetic shield plate 83 to avoid the active region 210 and the active region 710. In the present embodiment, the magnetic shield plate 83 is formed in a shape that causes the magnetic shield plate 83 to not overlap with the active region 210 of the control IC 20 and overlaps with a portion of the inactive region 220, as viewed in plan view. Further, the magnetic shield plate 83 is formed in shape that causes the magnetic shield plate 83 to not overlap with the active region 710 and the inactive region 720 of the reception IC 70, as viewed in plan view.

In the magnetic shield plate 83, a hole portion 832, a cutout portion 833, and a hole portion 834 are formed at portions respectively overlapping with the motor coil 412 of the first motor 41, the motor coil 422 of the second motor 42, and the motor coil 423 of the third motor 43 as viewed in plan view. Accordingly, the magnetic shield plate 83 is formed in a shape that causes the magnetic shield plate 83 to overlap with at least portions of the respective motors 41, 42, 43, specifically, portions other than the motor coils 412, 422, 432, such as the respective stators 413, 423, 433, the rotors 414, 424, 434, and the like, as viewed in plan view.

The magnetic shield plate 83 is formed in a shape that causes the magnetic shield plate 83 to not overlap also with a button-type battery 14 and the antenna 60 as viewed in plan view.

As illustrated in FIG. 4, the antenna 60 includes an antenna core 61, and an antenna coil 62 wound around the antenna core 61. The antenna core 61 is formed by stacking a plurality of amorphous thin plates, for example, and includes a substantially rectangular linear portion 611 formed at the substantially center of the antenna core 61, and curved portions 612 formed on both end sides of the linear portion 611 by being curved in an approximately arc shape. The antenna coil 62 is wound around the linear portion 611 of the antenna core 61.

The respective curved portions 612 of the antenna core 61 are housed in recessed groove portions of the plastic-made antenna frames 613, 614 respectively. An antenna substrate 63 to which an end portion of the antenna coil 62 is coupled is fixed to one antenna frame 613.

The antenna 60 is disposed along the outer periphery of the main plate 80, and the control IC 20, the reception IC 70, and the second motor 42 are disposed at a space on a center side of the antenna 60 on the main plate 80, that is, a space between the antenna frames 613, 614, as viewed in plan view.

The control IC 20 and the reception IC 70 are disposed between the first motor 41, the third motor 43, and the antenna coil 62. Accordingly, at least a distance between the first motor 41 and the antenna coil 62 and a distance between the third motor 43 and the antenna coil 62 are set longer than a distance between the control IC 20 and the antenna coil 62. With such a configuration, the influence of the first motor 41 and the third motor 43 on the antenna 60 can be reduced.

Manner of Operation and Advantageous Effect of Embodiment

The magnetic shield plate 83 includes the cutout portion 831 and is formed in a shape that causes the magnetic shield plate 83 to not overlap with the active region 210 of the control IC 20 as viewed in plan view. Accordingly, it is possible to prevent the occurrence of a phenomenon that noises generated in the active region 210 of the control IC 20 is transmitted to the antenna coil 62 of the antenna 60 via the magnetic shield plate 83 so that the reception sensitivity of the antenna 60 is lowered. That is, in the active region 210, circuits such as the oscillation circuit 21 and the frequency dividing circuit 22 where noises are generated due to clock signals are disposed. However, it is possible to prevent the noises from being transmitted to the magnetic shield plate 83 and hence, it is possible to prevent the reception sensitivity of the antenna 60 from being adversely influenced by the noises due to the clock signals.

Further, the magnetic shield plate 83 overlaps with at least portions of the respective motors 41, 42, 43, specifically, the stators 413, 423, 433 and the rotors 414, 424, 434. Accordingly, it is possible to prevent the driving of the motors 41, 42, 43 from being adversely influenced by the external magnetic field. Further, one sheet of magnetic shield plate 83 having a large area can be used and hence, the assembling process of the movement 10 can be simplified.

The transmission of noises from the active region 210 to the magnetic shield plate 83 can be prevented. Accordingly, it is also possible to cause the magnetic shield plate 83 to approach or to be brought into contact with the back surface of the circuit board 82 on which the control IC 20 is mounted and hence, the movement 10 can be made thin, that is, the electronic timepiece 1 can be made thin. Further, the hole portion 832, the cutout portion 833, and the hole portion 834 are formed in the magnetic shield plate 83, and the motor coil 412 is disposed in the hole portion 832, the motor coil 422 is disposed in the cutout portion 833, and the motor coil 432 is disposed in the hole portion 834. Also in this respect, the movement 10 can be made thin.

The magnetic shield plate 83 can be made to overlap with the inactive region 220 of the control IC 20 as viewed in plan view and hence, the degree of freedom in arrangement position of the control IC 20 can be enhanced. Further, the pads 221 serving as an input-output unit and the electrostatic protective circuit are disposed in the inactive region 220. Accordingly, even when the inactive region 220 overlaps with the magnetic shield plate 83 as viewed in plan view, there is no possibility that noises are transmitted to the magnetic shield plate 83 and hence, it is possible to prevent lowering of the reception sensitivity of the antenna 60.

The magnetic shield plate 83 has a shape that causes the magnetic shield plate 83 to not overlap with the active region 710 of the reception IC 70 mounted on the circuit board 82. Accordingly, even when noises are generated in the active region 710 of the reception IC 70, it is possible to prevent the noises from being transmitted to the antenna coil 62 via the magnetic shield plate 83 and hence, it is possible to further prevent the lowering of the reception sensitivity of the antenna 60.

The control IC 20 is disposed between the first motor 41 and the antenna coil 62 of the antenna 60, and the reception IC 70 is disposed between the third motor 43 and the antenna coil 62 of the antenna 60 and hence, the first motor 41 and the third motor 43 can be disposed away from the antenna coil 62. Accordingly, it is possible to prevent noises generated by the first motor 41 and the third motor 43 from being transmitted to the antenna coil 62 and hence, it is possible to further prevent the lowering of the reception sensitivity of the antenna 60. Particularly, the first motor 41 for driving the second hand 5 in a short driving cycle can be disposed away from the antenna coil 62 and hence, the lowering of the reception sensitivity of the antenna 60 can be effectively prevented.

Modification

The present disclosure is not limited to the above-described embodiment, and modifications, improvements, and the like within the scope in which the object of the present disclosure can be achieved are included in the present disclosure.

For example, the magnetic shield plate 83 is formed so as not to overlap with the control IC 20 and the reception IC 70 by forming the cutout portion 831. However, a hole portion may be formed instead of forming the cutout portion 831.

Although the magnetic shield plate 83 overlaps with a portion of the active region 210 of the control IC 20, the magnetic shield plate 83 may be formed in a shape that causes the magnetic shield plate 83 to not overlap with the entire surfaces of the active region 210 and the inactive region 220. Further, the magnetic shield plate 83 may be formed in a shape that causes the magnetic shield plate 83 to overlap with a portion of the inactive region 720 of the reception IC 70 as viewed in plan view.

Still further, it is sufficient that the magnetic plates 83 does not overlap with at least the active region 210 of the control IC 20 as viewed in plan view. For example, the magnetic shield plate 83 may overlap with the active region 710 of the reception IC 70 as viewed in plan view. That is, the reception IC 70 is an IC for processing radio waves and hence, the reception IC 70 can be controlled such that the reception IC 70 does not adversely affect the reception frequency of the antenna 60. Accordingly, even when the reception IC 70 overlaps with the magnetic shield plate 83 as viewed in plan view, the effect of the reception IC 70 on the reception sensitivity of the antenna 60 is small. On the other hand, the control IC 20 is operated by the CPU 23 and the like at various clocks and hence, control of the frequency is difficult. Accordingly, the effect of the control IC 20 on the reception sensitivity of the antenna 60 is large compared to that of the reception IC 70. Accordingly, it is sufficient for the magnetic shield plate 83 to not overlap with at least the active region 210 of the control IC 20 as viewed in plan view. With such a configuration, even when reception IC 70 overlaps with the magnetic shield plate 83 as viewed in plan view, the lowering of the reception sensitivity of the antenna 60 can be suppressed.

The magnetic shield plate 83 is not limited to a configuration having the hole portion 832 in which the motor coils 412 is to be disposed, the cutout portion 833 in which the motor coil 422 is to be disposed, and the hole portion 834 in which the motor coil 432 is to be disposed.

The circuit configurations of the control IC 20 and the reception IC 70 are not limited to the above-described embodiment, and may include other circuits or other input-output units. Further, although the control IC 20 and the reception IC 70 are each constituted of one IC, the control IC 20 and the reception IC 70 may also be constituted of a plurality of ICs respectively.

The semiconductor device is not limited to an integrated circuit such as the control IC 20, the reception IC 70, or the like, and may be a semiconductor element, a MEMS, or the like. Here, the "MEMS" is an abbreviation for Micro Electro Mechanical Systems.

In the above-described embodiment, the electronic timepiece 1 includes three motors. However, the electronic timepiece 1 may include one or two motors. Further, the electronic timepiece 1 may include four or motors as in a case where the electronic timepiece includes a small hand disposed on a sub dial, for example. That is, the number of motors, the number of hands, the number of buttons, and the like may be set corresponding to a type of the electronic timepiece, or the like.

Summary of Present Disclosure

According to the present disclosure, there is provided an electronic timepiece including: an antenna configured to receive a standard radio wave, a hand, a motor configured to drive the hand, a circuit board having a front surface on which a semiconductor device including an active region is mounted, and a magnetic shield plate disposed on a back surface side of the circuit board, the magnetic shield plate having a shape that overlaps at least a portion of the motor and does not overlap the active region of the semiconductor device in plan view as viewed in a direction orthogonal to the front surface of the circuit board.

According to the electronic timepiece of the present disclosure, the magnetic shield plate is formed in a shape that does not overlap the active region of the semiconductor device. Accordingly, it is possible to prevent the occurrence of a phenomenon that noises generated in the active region of the semiconductor device are transmitted to the antenna via the magnetic shield plate so that the reception sensitivity of the antenna is lowered. Further, the magnetic shield plate overlaps with at least a portion of the motor and hence, it is possible to prevent the driving of the motor from being adversely influenced by the external magnetic field.

In the electronic timepiece of the present disclosure, it is preferable that an oscillation circuit and a frequency dividing circuit be disposed in the active region of the semiconductor device, and an input-output unit and an electrostatic protective circuit be disposed in an inactive region other than the active region.

According to the electronic timepiece of the present disclosure, even when noises due to a clock signal are generated in the oscillation circuit and the frequency dividing circuit disposed in the active region, it is possible to prevent the noises from being transmitted to the magnetic shield plate and hence, it is possible to prevent the reception sensitivity of the antenna from being adversely influenced by the noises due to the clock signal. Further, the input-output unit and the electrostatic protective circuit are disposed in the inactive region and hence, there is no possibility that noises are transmitted to the magnetic shield plate even when the inactive region overlaps with the magnetic shield plate as viewed in plan view. Accordingly, it is possible to prevent lowering of the reception sensitivity of the antenna.

In the electronic timepiece of the present disclosure, it is preferable that a receiving semiconductor device for controlling reception processing performed by the antenna be mounted on the front surface of the circuit board, and the magnetic shield plate have a shape that does not overlap with an active region of the receiving semiconductor device as viewed in plan view.

When the receiving semiconductor device is mounted on the circuit board, the magnetic shield plate has a shape that does not overlap the active region of the receiving semiconductor device. Accordingly, even when noises are generated in the active region of the receiving semiconductor device, it is possible to prevent the occurrence of a phenomenon that the noises are transmitted to the antenna via the magnetic shield plate so that the reception sensitivity of the antenna is lowered.

In the electronic timepiece of the present disclosure, it is preferable that the antenna include an antenna coil, a plurality of the motors be provided, and a distance between at least one motor out of the plurality of motors and the antenna coil be longer than a distance between the semiconductor device and the antenna coil.

Noises generated by the motor affect the lowering of the reception sensitivity of the antenna compared to the noises generated by the semiconductor device. Accordingly, the effect of the motor can be reduced by separating the at least one motor from the antenna coil compared to the semiconductor device.

What is claimed is:

1. An electronic timepiece comprising:

an antenna configured to receive a standard radio wave;

a pointer;

a motor configured to drive the pointer;

a circuit board having a front surface mounted with a semiconductor device including an active region; and a magnetic shield plate disposed at a back surface side of the circuit board, wherein the magnetic shield plate overlaps at least a portion of the motor in a plan view, and the magnetic shield plate is completely laterally shifted from the active region of the semiconductor device in the plan view.

2. The electronic timepiece according to claim 1, wherein the active region of the semiconductor device includes an oscillation circuit and a frequency dividing circuit.

3. The electronic timepiece according to claim 1, wherein the active region of the semiconductor device includes neither an input-output unit nor an electrostatic protective circuit.

4. The electronic timepiece according to claim 1, wherein the front surface of the circuit board is mounted with a receiving semiconductor device configured to control reception processing performed by the antenna, and the magnetic shield plate completely laterally shifted from an active region of the receiving semiconductor device in the plan view.

5. The electronic timepiece according to claim 1, wherein the antenna includes an antenna coil, a plurality of the motors are provided, and a distance between at least one motor out of the plurality of the motors and the antenna coil is longer than a distance between the semiconductor device and the antenna coil.

* * * * *